United States Patent [19]
Smith

[11] Patent Number: 5,379,552
[45] Date of Patent: Jan. 10, 1995

[54] DOOR PROTECTOR

[75] Inventor: Blaine O. Smith, Salt Lake City, Utah

[73] Assignee: Dynatec International Inc., Salt Lake City, Utah

[21] Appl. No.: 28,344

[22] Filed: Mar. 9, 1993

[51] Int. Cl.⁶ .................................................. E06B 3/30
[52] U.S. Cl. ........................................ 49/460; 16/1 R
[58] Field of Search ................... 49/70, 460; 16/1 R, 16/DIG. 2; 52/173.1, 750, 202; 248/345.1; 150/155, 158; 119/29

[56] References Cited

U.S. PATENT DOCUMENTS

| | | | |
|---|---|---|---|
| 1,709,911 | 4/1929 | Hyams | 16/DIG. 2 X |
| 2,030,135 | 2/1936 | Carpenter | 16/1 R X |
| 2,051,531 | 8/1936 | Roberts | 49/460 |
| 2,096,389 | 10/1937 | Bode | 16/1 R X |
| 2,655,122 | 10/1953 | Adams | . |
| 3,085,551 | 4/1963 | Helmer | . |
| 3,144,677 | 8/1964 | Hauke | 16/1 R |
| 3,916,838 | 11/1975 | Swart | 49/460 X |
| 4,539,936 | 9/1985 | Majewski | . |
| 4,611,556 | 9/1986 | Frank | 119/29 |
| 4,790,122 | 12/1988 | Marriott | 52/750 X |
| 4,947,606 | 8/1990 | La See | 49/460 X |
| 5,038,703 | 8/1991 | Frush | . |
| 5,103,593 | 4/1992 | McNaughton | 49/460 |
| 5,113,795 | 5/1992 | Delzio | 119/29 X |

FOREIGN PATENT DOCUMENTS

| | | | |
|---|---|---|---|
| 2286621 | 4/1976 | France | 16/1 R |
| 2913596 | 2/1980 | Germany | 49/460 |

Primary Examiner—Peter M. Cuomo
Assistant Examiner—Jerry Redman
Attorney, Agent, or Firm—Thorpe North & Western

[57] ABSTRACT

A door protector used for protecting an area on a door from marring caused by the scratching of dogs. A protective pad is provided with a scratching surface. The scratching surface has a texture such that as a dog scratches thereon with its paw an audible sound is generated. The sound alerts the dog's owner that the dog desires to pass through the door. The protective pad is adhered to the surface of the door so that when the dog scratches on the protective pad the sound of the scratching is transmitted to the door so the dog owner is alerted that the dog is at the door. The protective pad is at least translucent, or even somewhat transparent, so that the color and texture of the door surface shows through the protective pad. The door protector is aesthetically pleasing to the dog's owner and satisfies the dog's desire to scratch on the door and functions to alert the dog's owner of the scratching.

14 Claims, 2 Drawing Sheets

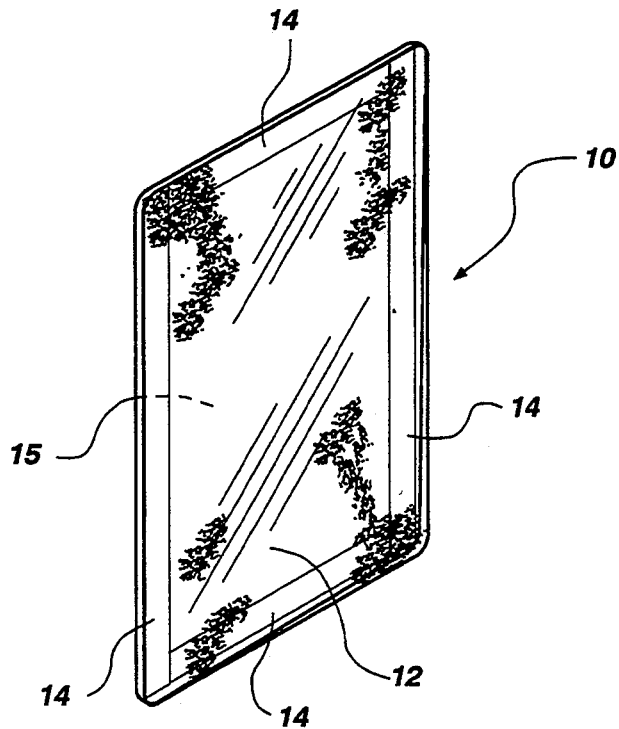
Fig. 2
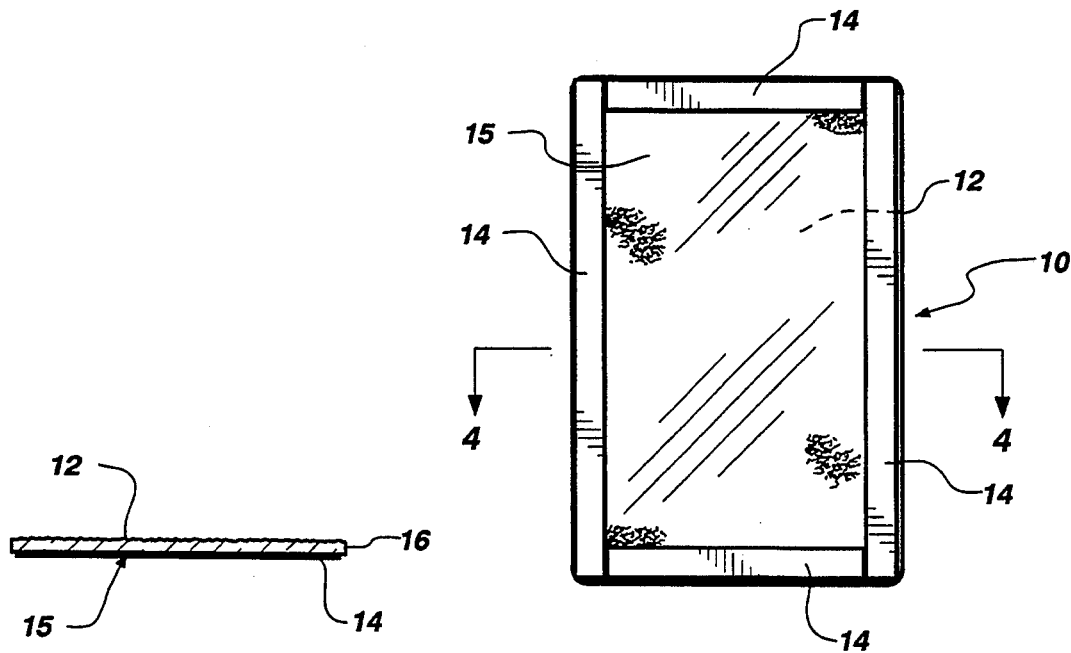
Fig. 4
Fig. 3

DOOR PROTECTOR

BACKGROUND

1. The Field of the Invention

This invention relates to devices which protect doors from marring and damage due to scratching by animals such as dogs.

2. The Prior Art

Pets are an important part of many households. There are, however, many challenges which accompany the ownership of a pet. Pets can, even if properly trained, damage the property of their owner. For example, dogs often damage the property of their owner. A product which reduces pet-caused damage to the owner's property will increase the enjoyment of the pet by its owner.

Many dog owners let their dogs in and out of their house via an exterior door. A dog will communicate its desire to pass through the door by whining, whimpering, barking, and/or scratching on the door. It is generally accepted wisdom that some dogs prefer scratching on the door and/or door jam to communicate their desire to pass through the closed door.

Most undesirably, scratching on the door, door jam, or an adjacent wall will cause damage. The doors through which owners let their dogs pass are often expensive decorative, visually important components of the house. Regardless of whether the door is fabricated from wood, metal, or even some other material, the scratching of a dog will, in time, mar or otherwise damage the surface of the door.

In an effort to avoid damage caused by pet scratching on and around a door, owners of pets commonly install decorative smooth metal plates over the locations on and around the door where the pet tends to scratch. Unfortunately, since scratching on the metal plate does not produce any sound, a dog will often continue to scratch the door at some other location. Thus, the scratching and its accompanying marring and damage continue at other locations.

Other attempts to protect doors from pet scratching involve hanging sheets of material from the door knob so that the pet scratches the material rather than the door. Many of the prior approaches are not suitable for use on an exterior location. Some of these prior approaches even suggest including a chemical pet repellant to repulse the pet. Undesirably, devices which hang from the door knob can, at most, protect the area of the door under the door knob.

Other prior devices which have been proposed include a bell or some other sounding device which rings when the pet scratches the device, thus alerting the owner of the pet's desire to pass through the door. Disadvantageously, such devices can be relatively complicated. Furthermore, many of the previously available devices are visually obtrusive and thus are aesthetically undesirable to the pet's owner and guests.

In view of the forgoing, it would be an advance in the industry to provide a device which was capable of protecting doors and the like from pet scratching while allowing the pet to satisfy its urge to scratch while being aesthetically pleasing to the pet owner as well.

BRIEF SUMMARY AND OBJECTS OF THE INVENTION

In view of the above described state of the art, the present invention seeks to realize the following objects and advantages.

It is a primary object of the present invention to provide a device for protecting doors and the like from the scratching of pets which satisfies the desires of both the pet and the pet owner better than the previously available devices.

It is another object of the present invention to provide a device for protecting doors and the like from the scratching of pets which is attractive to the pet so that scratching on other parts of the door does not occur.

It is a further object of the present invention to provide a device for protecting doors and the like from the scratching of pets which transmits the sound made by scratching to the door so that the pet owner will be alerted to the scratching of the pet.

It is yet another object of the present invention to provide a device for protecting doors and the like from the scratching of pets which allows the surface of the door, or the door-like structure, to be seen through the device to provide an aesthetically pleasing appearance.

It is a still further object of the present invention to provide a device for protecting doors and the like from the scratching of pets which can be used both on an interior surface or on an exterior surface.

It is an even further object of the present invention to provide a device for protecting doors and the like from the scratching of pets which is simple in construction, easy to install, and which can be readily removed from the door or other surface.

These and other objects and advantages of the invention will become more fully apparent from the description and claims which follow, or may be learned by the practice of the invention.

The present invention provides a device which can be used for protecting an area on the surface of a door, and like surfaces, from marring caused by the scratching of dogs and similar animals. Embodiments of the present invention provide a protective pad which is substantially planar and having a dimensional area sufficient to cover the area of the door to be protected from the animal's scratching.

A scratching surface is provided on a first side of the protective pad. The texture of the scratching surface is such that as a dog scratches thereon with its paw, a clearly audible sound is generated thereby. The sound alerts the dog's owner that the dog desires to pass through the door.

The present invention also includes means for directly mounting the protective pad onto the surface of the door. It is preferred that the protective pad be adhered to the door, for example by use of double-sided adhesive tape. The protective pad should be mounted so that its back contacts the door when the animal scratches. When animal scratches on the protective pad the sound of the scratching is transmitted to the door so both the animal and the animal's owner hear the sound and the owner alerted that the animal is at the door. Thus, the protective pad shields the door surface from marring yet the animal is still allowed to scratch.

Moreover, the protective pad is at least translucent, or even somewhat transparent, so that when it is mounted on the door the color and texture of the door surface shows through the protective pad. The door protector of the present invention is aesthetically pleasing to the pet owner yet allows the pet to scratch on a door while ensuring that the sound generated by the scratching is loud enough for the pet and its owner to hear.

BRIEF DESCRIPTION OF THE DRAWINGS

In order to better appreciate how the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanying drawings in which:

FIG. 2 is a perspective view of the surface of the embodiment of the present invention illustrated in FIG. 1.

FIG. 3 is a elevational view of the back surface of the embodiment illustrated in FIGS. 1 and 2.

FIG. 4 is a cross sectional view of the embodiment of the present invention taken along line 4—4 of FIG. 3.

DETAILED DESCRIPTION OF THE PREFERRED EMBODIMENTS

Figure 1:
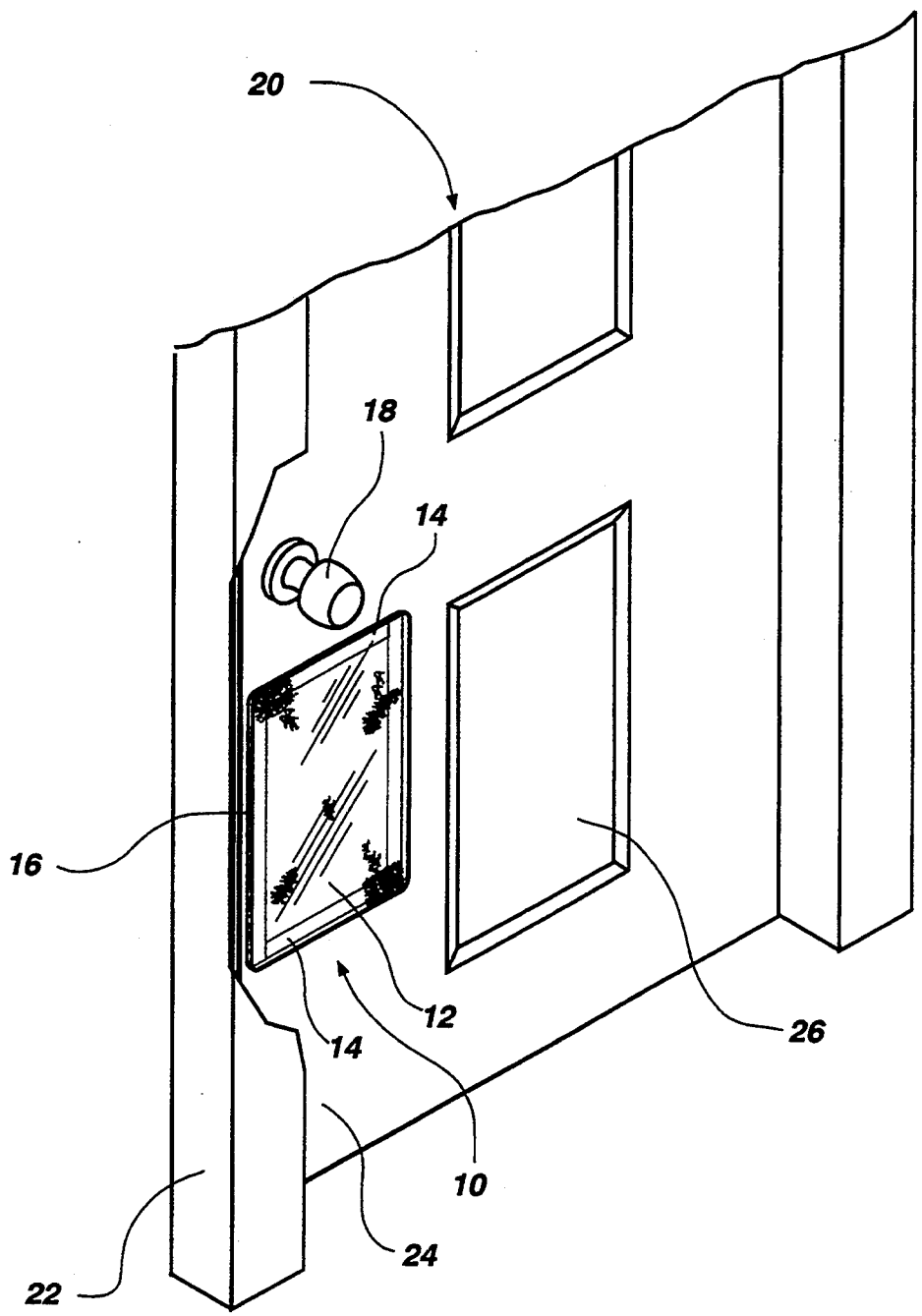
FIG. 1 is a partial perspective view of a door upon which has been installed the an embodiment of the present invention described herein.

Reference will now be made to the drawings wherein like structures will be provided with like reference designations.

FIG. 1 is a partial perspective view of a door, generally designated at 20, upon which the door protector of the present invention, generally designated at 10, has been installed. The door protector 10 is illustrated as being installed on the door 20 under the door knob 18. The position under the door knob 18 has been found to be the most preferred by dogs for scratching.

The door 20 is typical of exterior doors in many residential settings. The door 20 includes at least one panel structure 26 and a stile structure 24. It will be appreciated that the present invention can be installed on doors of many different types and constructions, for example, doors fabricated from wood, metal, and other materials and their accompanying structures can benefit from the present invention.

Moreover, the door protector 10 can be installed on like structures such as a door jamb 22, an adjoining wall surface, or any structures upon which animals such as dogs scratch. All of these structures are intended to be within the meaning of the term "like structures" as used herein.

FIGS. 2-4 are perspective, elevational, and cross sectional views, respectively, of the door protector 10 illustrated in FIG. 1. In the description which follows, FIGS. 1-4 will be collectively referenced.

The structure of the door protector 10 includes a protective pad 16 as is shown in the views of FIGS. 1-4. The size and shape of the protective pad 16 is selected to protect the area of the door 20, or other surface, where the animal has or is likely to scratch with its paws. Those skilled in the art will appreciated that the protective pad 16 should also be thick enough to withstand the scratching of pets and to meet the other requirements set forth herein.

While the relative dimensions and shape of the door protector 10 illustrated in FIG. 1 are generally preferred, it will be appreciated that the embodiments of the present invention can take many different shapes and sizes. Moreover, embodiments of the present invention can be fabricated either to be installed on an existing surface or incorporated into a surface at the time of its manufacture. The entire door protector 10 can be installed on the surface of the door 20 as represented in FIG. 1 or those skilled in the art will appreciate how the embodiments of the present invention can be installed flush with the surface of the door 20.

The protective pad 16 is provided with a scratching surface 12. The scratching surface 12 is a generally a patterned, nonplanar surface such that as the animal scratches thereon an audible sound is generated thereby. In general, the preferred texture of the scratching surface 12 is an undulating pattern of bumps and interspersed valleys. The preferred protective pad 16 and scratching surface 12 are obtained by use of one of a number of materials available in the art from the following manufactures all of whom are known in the art: ICI (Mfg. No. CIC-25, Pattern Designation: cracked ice); Manchester Plastics (Pattern Designation: cracked ice); KSH (Pattern Designation: cracked ice); Sheffield Plastics (Mfg. No. GT-9180, Pattern Designation: pebble finish); and, Plaskolite (Pattern Designation: cracked ice). The manufacturer's specification sheets and/or publications current as of the filing of this application for all of the designated manufacturer numbers and patterns are hereby incorporated herein by reference. It will be appreciated that other textures, such as a ribbed pattern or a sandpaper-like pattern, can also be used within the scope of the present invention.

Importantly, the texture of the scratching surface 12 should be one which a dog will desire to scratch and which will result in an audible sound when scratched. The protective pad 16 is preferably fabricated from a solid material through which the sound of the scratching will be clearly transmitted.

As shown best in FIG. 4, the protective pad 16 is provided with a smooth back 15 surface. The smooth back 15 facilitates the transmission of the sound to the door 20. The door stile 24 (FIG. 1) is flat. Thus, when the door protector is installed, it is preferred that the smooth back 15 be in contact with, or in very close proximity to, the surface of the door 20. This allows the sound generated by the scratching to be transmitted to the door 20 and the door 20 acts as a sounding board. In this fashion, a scratching dog is satisfied by the sound generated and the dog owner located in the house on the other side of the door 20 will be more likely to hear the scratching.

The protective pad 16 is mounted directly to the surface of the door rather than hanging the protective pad from the door knob 18. It is preferred that the protective pad 16 be adhered to the surface of the door 20. In the illustrated embodiment, the adhesive is conveniently provided by a double-sided clear adhesive tape 14, which is commonly available in the art, which is positioned on the smooth back 15 of the protective pad. The use of the double-sided tape 14 also allows the door protector 10 to be removed when desired. The double-sided tape 14 is one possible arrangement for the means for directly mounting the protective pad onto the surface of the door. Other adhesives or fasteners, such as screws, can also function as the means for directly mounting the protective pad.

It will be appreciated that using the double-sided adhesive tape allows for quick and easy installation by the pet owner and positions the smooth back 15 in contact with, or in very close proximity to, the surface of the door 20. Moreover, the pressure of the dog's paw when scratching pushes the protective pad 16 into closer or tighter contact with the surface of the door 20 providing better sound transmission.

The protective pad 16 can be fabricated from many different materials which will satisfy the above-described criteria, including the above-specified materials. It is preferred, however, that the material be at least translucent. In contrast to previously available devices, embodiments of the present invention strive to be visually unobtrusive and thus aesthetically pleasing to the pet owner. By choosing a material for the protective pad 16 which is at least translucent, the color and even the texture of the underlying door surface can show through. In the case of a wood door 20, it is desirable that the protective pad be transparent enough to allow the pattern of the wood grain to be suggested through the protective pad 16.

It will be appreciated that mounting the protective pad 16 so it is in contact with the door surface will facilitate transmission of the color and the texture of the door 20 through the protective pad 16. Alternatively, the protective pad 16 can be colored to match or contrast with the door 20.

As the transparency of the protective pad 16 and the double-stick tape 14 increases, the door protector 10 will be less obtrusive and more aesthetically pleasing to the pet owner. It will be appreciated that as transparency increases, a point will generally be reached where the scratching surface is too smooth and not enough sound will be generated by the pet's scratching and the scratching itself will likely cause noticeable damage and marring to the protective pad 16. Thus, a balance must be struck between the transparency of the protective pad 16 and the functioning of the scratching surface 12 to generate sound as a result of the pet's scratching.

Also, if the material used to fabricate the protective pad 16 can be damaged by the pet's scratching, the texture of the scratching surface 16 should function to make less noticeable any marring which does occur. Moreover, the protective pad 16 should be fabricated from a material which can withstand the effects of weather conditions which may be encountered when the door protector 10 is installed in an exterior location.

In view of the foregoing, it will be appreciated that the present invention provides an improved device for protecting doors and the like from the scratching of pets which satisfies the requirements of both the pet and the pet owner better than the previously available devices. The present invention also provides a device for protecting doors and the like which transmits the sound made by scratching to the door so that the pet owner will be alerted to the scratching of the pet.

The present invention also provides a door protector which allows the surface of the door or the like to be seen through the device to provide an aesthetically pleasing appearance and which can be used on either an interior surface or on an exterior surface and which is simple in construction, easy to install, and which can be readily removed from the door or other surface.

The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A device which can be used for protecting an area on a door having a front surface and other structures having a front surface from marring caused by dogs and other animals scratching upon the door, the device comprising:

a protective pad which is substantially planar and having a dimensional area sufficient to shield an area to be protected from an animal's scratching, the protective pad having a surface area which is substantially less than the surface area of the front surface and having a first side and a second side;

a scratching surface provided on the first side of the protective pad, the scratching surface having a first axis and a second axis perpendicular to the first axis and a nonsmooth textured surface such that as the animal scratches thereon by movement of a paw in a substantially vertical direction and parallel to the first axis the paw engages the textured surface and an intensified audible noise is created thereby which is greater than the audible noise created if the paw were scratched on a substantially smooth surface; and means for directly mounting the protective pad onto the front surface of the door over the area to be protected such that as the animal scratches on the scratching surface the protective pad remains in position on the door and the second side of the protective pad contacts the front surface and the audible sound is transmitted to the front surface and the protective pad shields the door surface from marring.

2. A device for protecting an area on a door having a surface and other structures having a surface as defined in claim 1 wherein the means for directly mounting comprises an adhesive provided on the second side of the protective pad.

3. A device for protecting an area on a door having a surface and other structures having a surface as defined in claim 2 wherein the adhesive comprises a double sided adhesive tape.

4. A device for protecting an area on a door having a surface and other structures having a surface as defined in claim 3 wherein the second side of the protective pad is substantially smooth.

5. A device for protecting an area on a door having a surface and other structures having a surface as defined in claim 1 wherein the protective pad is fabricated from a material which is at least translucent.

6. A device for protecting an area on a door having a surface and other structures having a surface as defined in claim 1 wherein the scratching surface comprises a plurality of bumps.

7. A device for protecting an area on a door having a surface and other structures having a surface as defined in claim 1 further comprising a door wherein the second side of the protective pad substantially contacts the door when the scratching surface is scratched by the animal.

8. A device for protecting an area on a door having a surface and other structures having a surface as defined in claim 1 further comprising a door, the protective pad being mounted on the door wherein the means for directly mounting comprises an adhesive material provided on the second side of the protective pad and about the perimeter of the protective pad.

9. A door protector to prevent damage to a door caused by a dog scratching upon the door, the door including front, the door protector comprising:

a protective pad which is substantially planar and having a dimensional area sufficient to cover the area to be protected from an animal's scratching, the protective pad having a surface area which is substantially less than the surface area of the front surface, a scratching surface being provided on substantially an entire first side of the protective pad, the scratching surface having a first axis and a second axis perpendicular to the first axis and a non-smooth textured surface such that as the dog scratches thereon by movement of a paw in a substantially vertical direction and parallel to the first axis the paw engages the textured surface and an intensified audible sound is generated thereby which is greater than the audible sound generated if the paw were scratched on a substantially smooth surface, the protective pad being at least translucent such that the color of any underlying surface is observable through the protective pad; and adhesive means for fixing the protective pad onto the surface of the door over the area to be protected such that the protective pad is at least in very close proximity to the surface of the door such that as the dog scratches on the scratching surface the protective pad contacts the front surface of the door such that the sound is transmitted thereto and such that the protective pad shields the door surface from marring.

10. A door protector to prevent damage to a door caused by a dog scratching upon the door as defined in claim 9 wherein the adhesive means comprises a double-sided adhesive tape.

11. A door protector to prevent damage to a door caused by a dog scratching upon the door as defined in claim 9 wherein the second side of the protective pad is substantially smooth.

12. A door protector to prevent damage to a door caused by a dog scratching upon the door as defined in claim 9 wherein the scratching surface comprises a plurality of bumps.

13. A door protector to prevent damage to a door caused by a dog scratching upon the door as defined in claim 9 further comprising a door, the protective pad being adhered to the door by an adhesive material provided about the perimeter of the protective pad.

14. A door protector for protecting an area on the surface of a door having a front surface to prevent damage caused by a dog scratching upon the door, the door protector comprising:

a protective pad which is substantially planar and having a dimensional area sufficient to protect the area to be protected from an animal's scratching and having a surface area which is substantially less than the surface area of the front surface, the protective pad having a first side and a second side, the second side being substantially smooth, the protective pad further being fabricated from a material which is at least translucent;

a scratching surface formed on the first side of the protective pad, the scratching surface being rigid and nonflexible and having a first axis and a second axis perpendicular to the first axis and a nonsmooth textured surface such that as the dog scratches thereon by movement of a paw in a substantially vertical direction the paw engages the textured surface and an intensified audible sound is generated thereby which is greater than the audible sound created if the paw were scratched on a substantially smooth surface; and a double sided adhesive tape, the double sided adhesive tape being at least translucent, disposed on the second side of the protective pad allowing the protective pad to be directly mounted on the front surface of the door over the area to be protected such that as the animal scratches on the scratching surface the protective pad contacts the door so that the sound generated by the scratching is transmitted to the door and such that the protective pad remains in position on the door and shields the door surface from marring.

* * * * *